United States Patent [19]

Moriki et al.

[11] Patent Number: 4,805,826
[45] Date of Patent: Feb. 21, 1989

[54] SLAG REMOVING APPARATUS FOR PAD-WELDING MACHINE

[75] Inventors: Yasumitsu Moriki, Tokyo; Hirotomo Numakura, Kawasaki; Masahiro Sakurai, Tokyo, all of Japan

[73] Assignee: Maruma Jysuharyo Kabushiki Kaisha, Tokyo, Japan

[21] Appl. No.: 99,408

[22] Filed: Sep. 21, 1987

[30] Foreign Application Priority Data

Sep. 30, 1986 [JP]  Japan ............................ 61-148819[U]

[51] Int. Cl.⁴ ............................ B23K 9/04; B23K 9/32
[52] U.S. Cl. ........................................ 228/18; 228/19; 228/27; 228/48; 228/201; 219/73.21; 219/76.1; 219/76.12; 51/5 R; 29/81 D
[58] Field of Search ....................... 228/18, 19, 25, 27, 228/28, 48, 201; 219/76.1, 76.12, 76.14, 73, 73.21; 29/81 R, 81 D, 81 F, DIG. 7; 51/5 R, 59 R, 61, 66

[56] References Cited

U.S. PATENT DOCUMENTS 3,024,349  3/1962  Hinrichsen et al. ................ 228/48
3,937,055  2/1976  Caruso et al. ..................... 29/81 D

*Primary Examiner*—Fred A. Silverberg
*Assistant Examiner*—Samuel M. Heinrich
*Attorney, Agent, or Firm*—Emmanuel J. Lobato; Robert E. Burns

[57] ABSTRACT

Described herein is a slag removing apparatus suitable for use on a padi-welding machine, which permits automation of the pad-welding operation and which essentially includes: a C-shaped roller holder located beneath a movable welding torch and provided with a rotational drive mechanism for a roller to be padded; a pair of extension arms horizontally extended on the open side of the roller holder and fixed in vertically adjustable positions; a guide rail support member provided with a rack and bridged between the extension arms in parallel relation with the rotational axis of the roller drive mechanism and detachably at least at one end thereof; a carriage having on a rockable plate a drive motor and a pinion disengageably meshed with the rack and movable along the support member; an inclined mount plate provided on the carriage with a predetermined angle of inclination; and a vibrational beating mechanism holding at least one needle bundle with the fore end thereof in face-to-face relation with the welding surface of the roller; the drive motor being driven in synchronism with movements of the torch in the transverse direction.

6 Claims, 5 Drawing Sheets

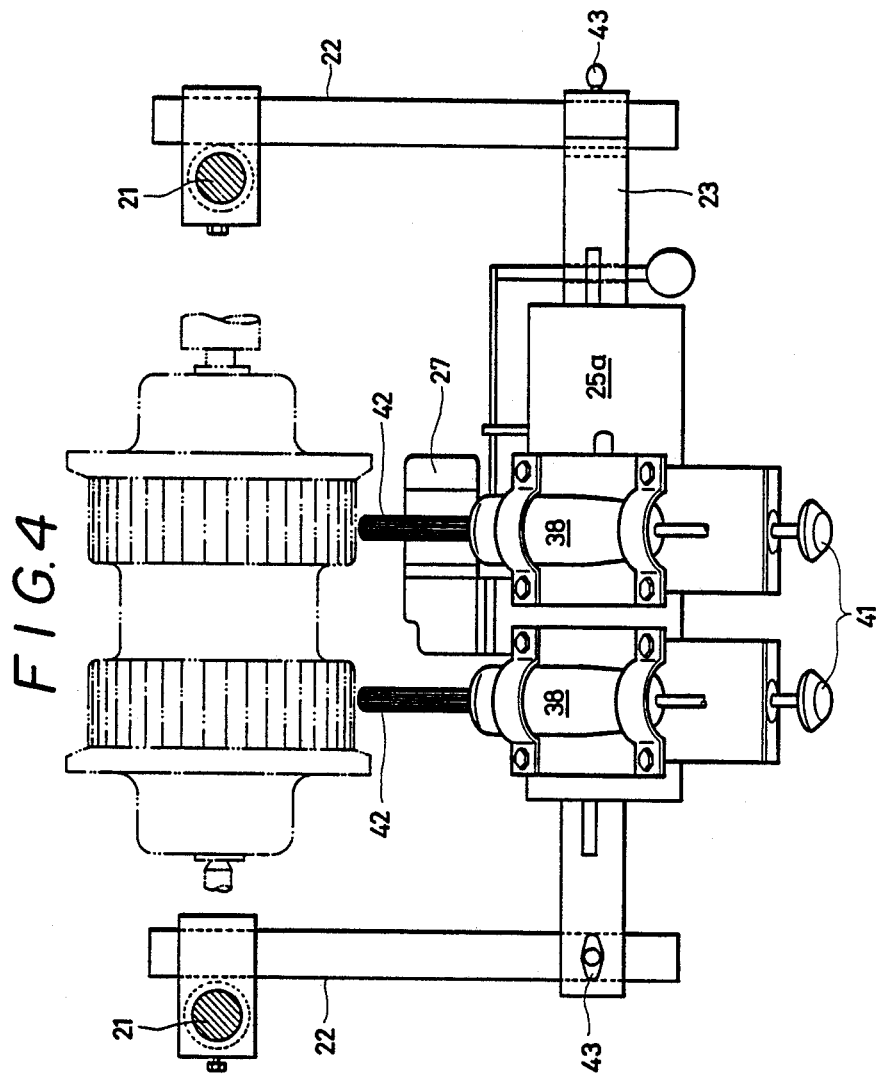

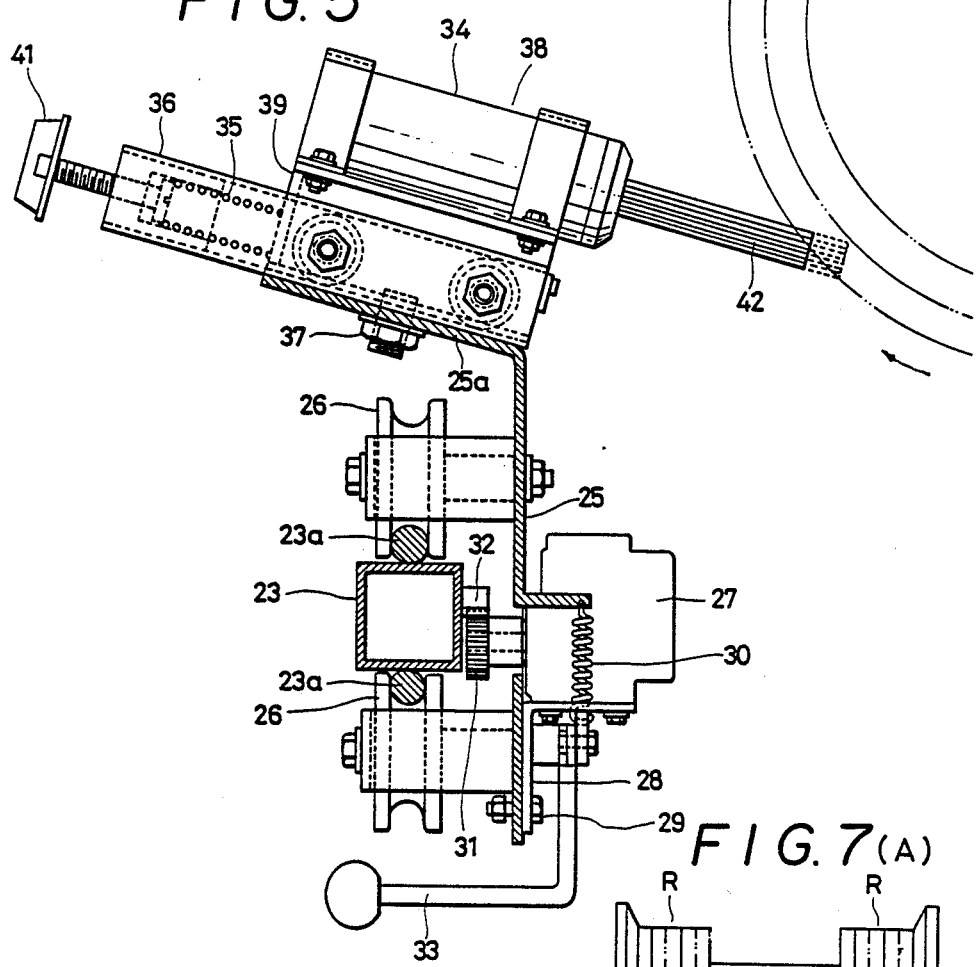

SLAG REMOVING APPARATUS FOR PAD-WELDING MACHINE

BACKGROUND OF THE INVENTION

1. Field of the Invention

This invention relates to a slag removing apparatus suitable for use in continuous pad-welding operation on a work piece with a circumferential surface, and more particularly to a slag removing apparatus which can be effectively employed in the submerged welding process for continuously padding circumferential surfaces of track rollers of bulldozers or other vehicles.

2. Description of the Prior Art

The submerged welding is generally adopted as a process which is suitable for pad-welding abraded portions of rollers or the like.

In the submerged welding process which resorts to a flux, however, the flux deposits and covers the surface of the welded portion in the form of a slag, making it difficult to form a welding layer continuously thereon.

In this connection, it has been the conventional practice for the stationed operator to remove the slag manually by applying impacts thereto with a hammer or the like, and this manual slag removing job has been a great obstacle to the automation or continuous operation of the pad-welding.

Besides, the hammering often makes flaws on the rollers in addition to large noises.

SUMMARY OF THE INVENTION

The present invention has its object in the provision of an apparatus for removing slag from the surface of a welded portion, which is adapted to beat the surface with the fore end of a needle bundle of a vibrational beating mechanism which holds the needle bundle in face to face relation with the circumferential surface of a roller and which is movable in the transverse direction to follow the movements of a welding torch, supporting the vibrational beating mechanism on a carriage which is movable toward and away from a roller holder to facilitate roller setting and ejecting operations.

With this arrangement, after setting a roller in position, a pad-welding operation can be performed continuously and automatically until a desired thickness is reached, without necessitating manual slag removing jobs, so that it becomes possible to improve the working efficiency to a marked degree.

In accordance with the present invention, there is provided a slag removing apparatus suitable for use on a pad-welding machine, which comprises: a C-shaped roller holder located beneath a movable welding torch and provided with a roller rotating mechanism; a pair of extension arms located in vertically adjustable positions and extended horizontally on the free side of the roller holder; a guide rail support member provided with a rack along one side thereof and bridged between the extension arms detachably at least at one end thereof and in parallel relation with the rotational axis of the roller rotating mechanism; a carriage having on a rockable plate a drive motor and a pinion disengageably meshed with the rack and movable along the support member; a mount plate provided on the carriage with a predetermined angle of inclination; and a vibrational beating mechanism having at least one bundle of needles and mounted in a fixed channel on the mount plate through a spring protrudably toward the roller holder; the drive motor being driven to follow movements of the welding torch in the transverse direction.

The above and other objects, features and advantages of the invention will become apparent from the following description and the appended claims, taken in conjunction with the accompanying drawings which show by way of example some preferred embodiments of the invention.

BRIEF DESCRIPTION OF THE DRAWINGS

In the accompanying drawings:

FIG. 4 is a plan view of the slag removing apparatus;

FIG. 5 is a vertical section of the slag removing apparatus;

FIG. 6 is a sectional view of a beating mechanism; and

FIGS. 7(A) and 7(B) are diagrammatic illustrations showing rollers in plan view for the explanation of the pad-welding operation.

DESCRIPTION OF PREFERRED EMBODIMENTS

Figure 1:
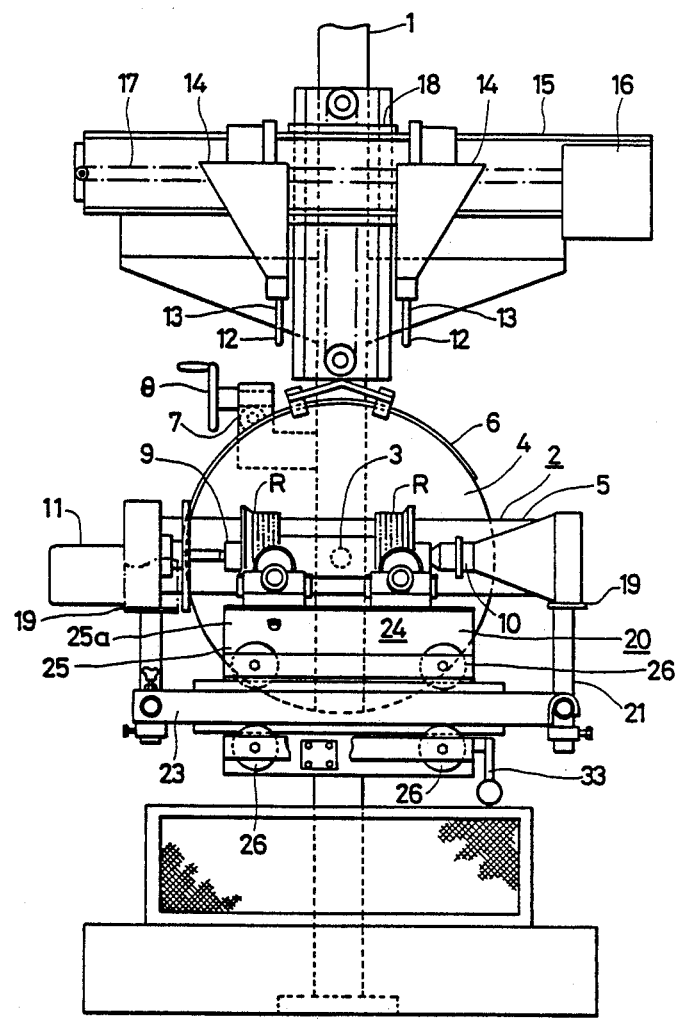
FIG. 1 is a schematic front view of a welding machine incorporating a slag removing apparatus according to the present invention.
Figure 2:
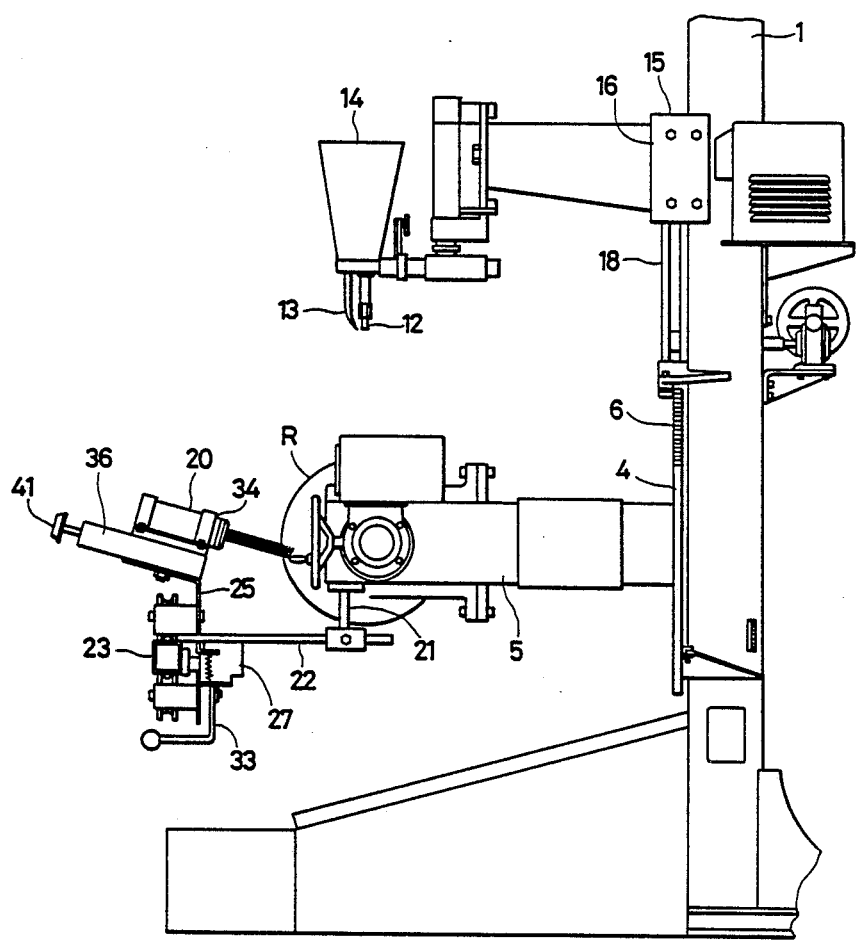
FIG. 2 is a side view of the welding machine shown in FIG. 1.
Figure 3:
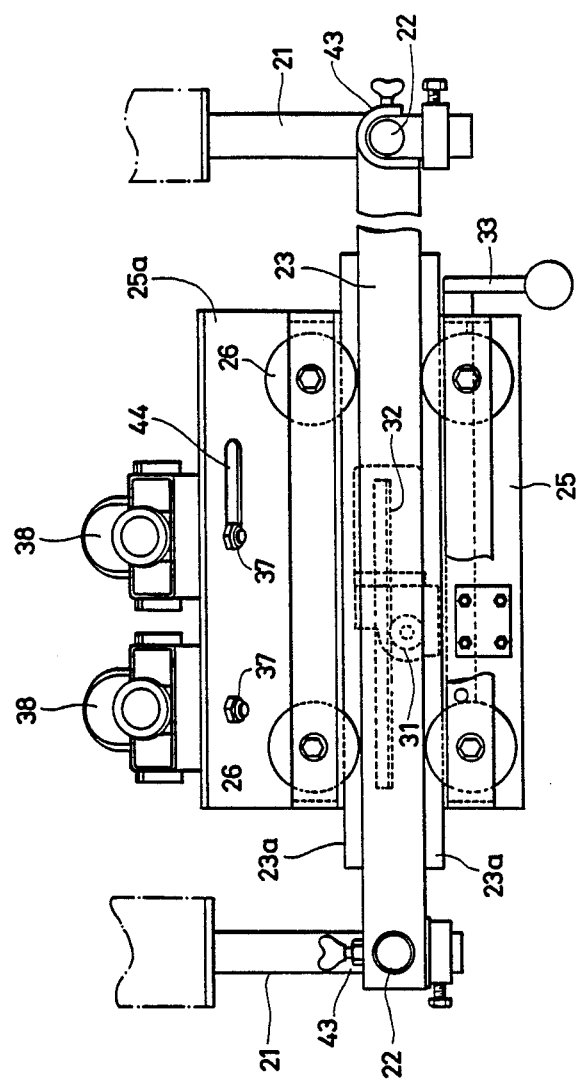
FIG. 3 is a front view of the slag removing apparatus.

The drawings show by way of example a dual type welding machine, in which indicated at 1 is a support column of the welding machine, and at 2 a work holder for rotatably holding a couple of work piece thereon, having C-shaped holder frames 5 securely fixed to a tiltable disk 4 which is pivotally supported on the front side of the support column at 3.

Denoted at 6 is an arcuate rack which is provided on part of the tiltable disk 4, at 7 a pinion which is in meshing engagement with the rack, and at 8 a handle which is provided with a worm for rotating the tiltable disk.

Workpiece R such as a couple of rollers or the like are gripped between grippers 9 and 10 at the fore end of the holder frame 5.

Designated at 11 is a rotational drive motor, and at 12 are welding torches each located in the proximity of a flux nozzle 13.

Indicated at 14 are flux hoppers, at 15 a guide beam for moving the welding torch 12 and flux nozzle 13 in lateral directions, at 16 a drive and control unit, and at 17 a chain. The beam 15 is slidable along a lift guide member 18.

The reference numeral 20 denotes a slag removing apparatus according to the present invention, including a pair of extension arms 22 are fixed through vertical members 21 to bottom portions 19 of the respective C-shaped holder frames on the open side thereof. A guide rail support member 23 is bridged between the paired extension arms detachably therefrom at least at one end thereof.

Indicated at 24 is a carriage which is provided with an inclined mount plate 25a with a predetermined open angle of, for example, 100–110 degrees relative to a vertical base plate 25. The reference numeral 26 denotes four rollers which can roll on and along a guide rail 23a on the front side of the base plate. Provided on the rear side of the base plate is a geared motor 27 which is mounted on a rockable plate 28, which is pivotally connected to the base plate 25 by a pin 29.

Designated at 30 is a spring for suspending the rockable plate 28, urging a pinion 31 of the motor into meshing engagement with a rack 32 which is integrally fixed to one side of the guide rail support member 23. Indicated at 33 is a lever for stretching the spring 30 to unmesh the pinion 31 from the rack 32.

The reference numeral 34 denotes a multi-needle type beating mechanism for removing slag, the mechanism including a pair of channel members 36 each accommodating a reaction absorber spring 35 and securely fixed to the inclined mount plate 25a as shown at 37. Slidably fitted in each one of the channel members 36 is a mount plate 39 mounting thereon a pneumatic vibrating jumper 38 of known construction. Indicated at 40 are rollers, and at 41 are handles for adjusting the springs 35 in the respective channel members.

When the rollers R are loaded or unloaded, the support member 23 is turned about its one end or completely removed from the extension arms 22 together with the carriage 24.

For setting the slag removing apparatus in position, the support member 23 is fixed on the extension arms 22 such that the fore ends of the needle bundles of the vibrating jumpers 38 are positioned in contact with the pad-welding surfaces on the rollers R, respectively.

The pad-welding operation itself is feasible by either one of the string and oscillating methods as shown in FIGS. 7(A) and 7(B). The welding torches 12 are moved along the roller surfaces which are put in rotation.

The movements of the welding torches 12 are controlled by the afore-mentioned control unit 16, and the geared motor 27 is driven by its control signals. Accordingly, the pinion 31 reciprocates the carriage 24 through the rack 32 in synchronism with the torch movements.

The needle bundle 42 of each vibrating jumper 38 on the carriage is constantly vibrated in back-and-forth directions to beat the welded surface on the roller at a position where the welded surface has turned more than 180 degrees and in a direction opposite to the rotational direction of the roller.

The temperature of the welding metal drops before reaching that position although it depends on the rotational speed of the roller and the kind of the welding metal, so that the slag which deposits on the welding metal is already in a relatively easily peelable state. Therefore, by the beating actions of the fore ends of the needle bundles, the fuse-deposited slag and overfluous flux are substantially completely removed even from depressed surface portions, permitting to form a fresh welding layer integrally thereon.

Consequently, it is possible to form a multiple number of welding layers continuously on the roller surface by an automatic operation without any efforts of the operator until a desired padding thickness is reached.

With the apparatus according to the invention, the initial positions of the fore ends of the needle bundles can be set arbitrarily by changing the position of the support member 23 on the extension arms 22 and the position of the carriage 24 on the support member 23.

Namely, the support member 23 is set in a suitable position by means of a fastening member 43, while the carriage 24 is set in position by disengaging the pinion 31 from the rack 32 by the lever 33.

The angle of inclination of the tilted mount plate 25a is changed depending upon the size of the roller R.

The reference numeral 44 indicates a slot which is provided in the tilted mount plate 25a for changing the relative positions of the two beaters in case of a dual type welding machine as shown.

Further, the frequency and amplitude of vibration of the vibrating jumpers may be changed arbitrarily but they suffice to be in normal ranges since they do not have great influences on the slag removing efficiency.

What is claimed is:

1. A slag removing apparatus in combination with a pad-welding machine, comprising:
    a C-shaped roller holder located beneath a movable welding torch and provided with a rotational drive mechanism for rotating the roller to be padded;
    a pair of extension arms horizontally extended on the open side of said roller holder and fixable in vertically adjustable positions;
    a guide rail support member provided with a rack and bridged between said extension arms in parallel relation with the rotational axis of said roller drive mechanism and detachable at least at one end thereof;
    a carriage having on a rockable plate a drive motor and a pinion disengageably meshed with said rack and movable along said support member;
    an inclined mount plate provided on said carriage with a predetermined angle of inclination; and
    a vibrational beating mechanism on said mount plate holding at least one needle bundle with a fore end thereof in face-to-face relation with a welding surface of said roller for vibrational beating thereof;
    said drive motor being driven in synchronism with movements of said torch in a transverse direction.

2. The apparatus of claim 1, including vertical members, said extension arms being supported by said vertical members to extend horizontally on the open side of said roller holder.

3. The apparatus of claim 1, including a spring urging said pinion into meshing engagement with said rack, and means including said spring and an operating handle for effecting disengagement therefrom.

4. The apparatus of claim 1, including a base plate on said carriage, and means pivotally connecting said rockable plate to said base plate.

5. The apparatus of claim 1, including a fixed channel member on said inclined mount plate, said needle bundle is supported in said fixed channel member, and a spring biasing the needle bundle outwardly from the channel member.

6. The apparatus of claim 1, wherein said pad-welding machine is a dual type having two welding torches and two roller holders, and said vibrational beating mechanism is provided in association with each roller holder.

* * * * *